June 24, 1930.  F. W. HORSTMANN  1,765,375
FUR ORNAMENTING MACHINE
Filed April 16, 1927
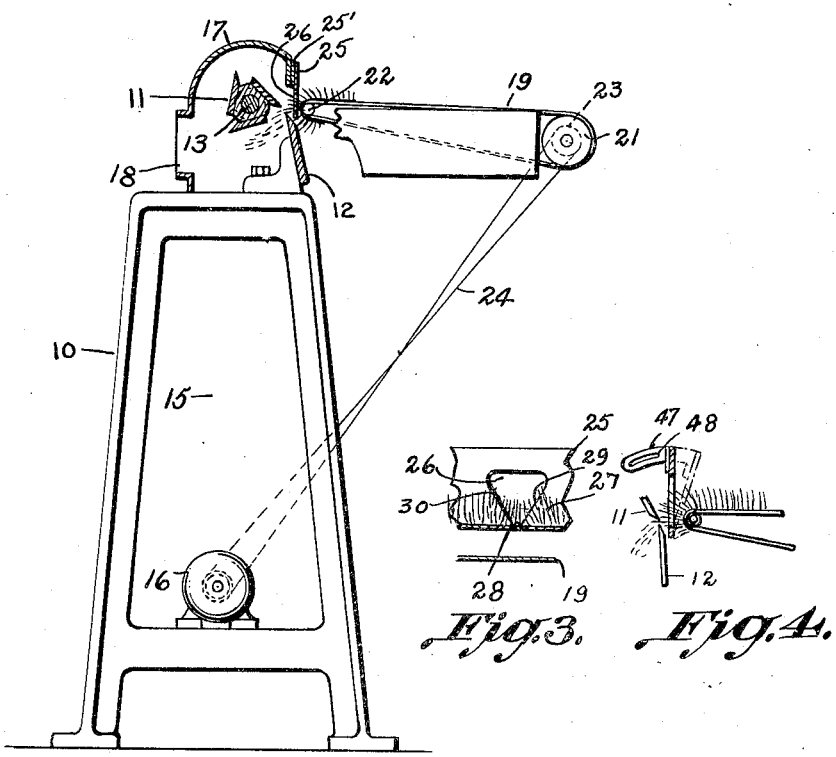
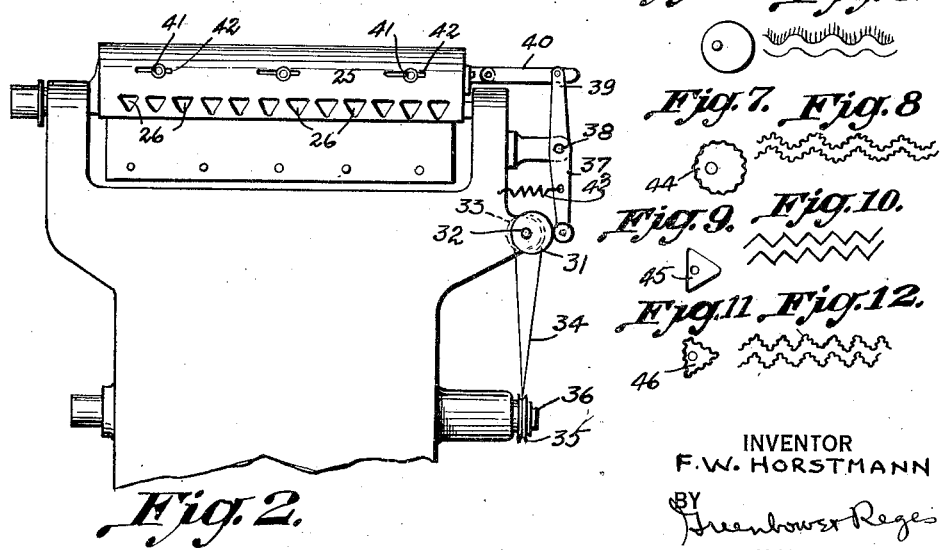
INVENTOR
F. W. HORSTMANN
BY
ATTORNEYS Patented June 24, 1930

1,765,375

UNITED STATES PATENT OFFICE

FREDERICK W. HORSTMANN, OF MAPLEWOOD, NEW JERSEY

FUR-ORNAMENTING MACHINE

Application filed April 16, 1927. Serial No. 184,231.

The present invention relates to a machine and method of producing novel and ornamental patterns or designs upon the fur surfaces of animal pelts or the like.

In the manufacture or preparation of skins or pelts to be used as wearing apparel either as a trimming or as a garment, it is desirable to enhance the appearance of the fur surface by producing variations therein as by shearing the nap or hair to produce, for example, a series of waves.

A machine for accomplishing this result is set forth in my Patent No. 1,737,085, granted November 26, 1929.

In the said application a practical and effective machine is disclosed in which the fur is moved over a conveyor into operative relation to shearing knives. A relative movement is produced between the conveyor and shearing mechanism and a sinuous or wavy surface is produced.

The present invention provides a machine in which a fur surface is ornamented without relative movement between the same and the shearing mechanism.

In practicing the present invention a shearing machine of the usual type may be employed having the customary shearing mechanism and suction fan and a conveyor for delivering the furred surface of the skin to the shearing mechanism. To this machine I apply a guard element of such character as to be capable of diverting portions of the fur from the knives. That is, the guard is so positioned that as the fur or hair is sucked toward the conveyor the guard permits certain portions of the hair to be sucked fully across the knives while other portions of the hair are deflected from a straight path across the knives and are made to take a longer path and are consequently sheared at different points. For instance, a portion of the fur may be cut adjacent the skins while portions adjacent to this short portion may be of greater length. The guard is, however, so arranged that a gradual increase in the length of the cut fur may be produced at opposite sides of a short sheared portion. By moving the skin in the usual manner on the conveyor in combination with the guard, a trough or series of troughs may be produced in the surface of a skin. In addition to the production of a series of troughs I am able, by reason of the novel guard, to produce the troughs of sinuous form. This is accomplished by imparting a reciprocating movement to the guard in a direction transverse to the path of movement of the skin. Furthermore, it is possible to give the guard such movement as to not only produce a series of sinuous waves but to impart upon each wave a super-imposed sinuous wave or instead of a wave, a series of zig-zag troughs may be produced, which in turn, may have their surfaces serrated or sinuous.

The various combinations and striking effects possible by reason of the present construction will be more readily understood by reference to the accompanying drawing in which:

Fig. 1 is an end view, partly in section, of a shearing machine having the present invention applied thereto;

Fig. 2 is a fragmentary view of the machine shown in Fig. 1;

Fig. 3 shows a portion of the guard and indicates the manner in which the fur is applied thereto;

Fig. 4 is a side view of the guard shown in Fig. 3 and illustrates the relative position of a conveyor with respect thereto;

Fig. 5 shows a cam for causing a horizontal movement of the guard;

Fig. 6 indicates the form of wave produced by the use of the cam shown in Fig. 5;

Fig. 7 shows another form of cam;

Fig. 8 indicates the form of wave produced by the cam shown in Fig. 7; and

Figs. 9, 10, 11 and 12 show other modified forms of cams and the style of wave or cut in the fur surface produced thereby.

As an example of one embodiment of the invention, a shearing machine is shown comprising a frame or supporting table 10 having mounted thereon a rotary cutter 11 in operative relation to a bed-knife 12. The rotary cutter may be mounted on a shaft 13 provided with a pulley (not shown) connected by a belt 15 to a motor 16 operable to actuate the cutter. A housing 17 may be mounted on the frame 10 to partially enclose the shearing mechanism, leaving an opening at the knives to permit the entrance of fur thereto when drawn thereacross by a suction produced by a fan or other means (not shown) in the usual manner. The housing 17 has an outlet 18 which may be connected to an exhaust apparatus as is well known to those versed in the fur shearing art.

For the purpose of applying a skin to the shearing mechanism, a conveyor 19, rotatable about a driving roller 21 and an idler roller 22 is suitably journalled in bearings at the sides of the machine. The driving roller 21 may be provided with a pulley 23 connected by a belt 24 to another driving pulley (not shown). The mechanism for driving the apron or conveyor of machines of this type is also well known and it is believed that the same will be fully understood.

In carrying out the present invention, I provide the above described machine with what may be termed a guard 25 which is in the form of a plate. This guard is disposed between the idler 22 of the conveyor and the shearing mechanism. The fur, therefore, as it is moved by the conveyor is disposed in such relation to the guard as to brush or wipe the same and by providing a series of apertures 26 in the guard certain portions of the hair will be permitted to pass between the knives while adjacent portions are shielded from the knives. By reason of the mere shielding of portions of the fur, the same may be sheared to form a series of troughs. The present invention, however, operates to control the shape of the troughs so that viewing the same transversely of their lengths the hair will have the form of a true sine wave or the form of an inverse curve. This is accomplished by the novel shape of the apertures 26 which, as shown, are of triangular shape having the corners rounded, one of the corners being lowermost for the entrance of the fur as it is moved against the guard 25.

As more clearly shown in Figs. 3 and 4, the hair 27 is brushed against the edges of the apertures 26. It will be seen that since the lower corner 28 of the aperture is nearest to the skin, the hair will be cut closer to the skin while the adjacent fur or hairs will be sheared at different points. Since the edges 29 and 30 are inclined, the hair which is sucked thereover by the fan will only be pulled across the knives to the extent as permitted at the particular point on the edge of the apertures over which they contact. Thus, when the fur is moved and the shearing mechanism is in operation a uniform undulating surface will be produced. It is to be understood that the particular form or configuration of the apertures may be varied as desired to vary the shape of the troughs produced or the depth of the troughs may be varied by a variation in the angular relation of the guard 25 to the shearing mechanism.

For the purpose of giving a more artistic appearance to the troughs, means are provided to make the same of sinuous form as shown diagrammatically in Fig. 6. This is accomplished by mechanism for reciprocating the guard 25 through the agency of a cam 31 mounted on a stub shaft 32 which is provided with a pulley 33 driven through belt 34, engaging with a pulley 35 on a shaft 36 journaled on the frame of the machine. This shaft may be driven from any suitable source of power (not shown). Connection between the cam 31 and the guard 25 may be had by means of a lever 37 pivoted at 38. An end 39 of the lever may be attached to a link 40 extending from the guard plate 25, the guard plate being slidably attached to a plate 25′ by means of headed pins 41 extending through slots 42 in the said guard. The lower or opposite end of the lever 37 may be normally held in contact with the cam 31 by a spring 43. A rotation of the cam 31 will operate the lever 37 to reciprocate the guard 25 and such action may be performed while a skin is being fed to the knives by the conveyor and what may be termed sinuous undulations will be produced in the surface of the fur such as shown in Fig. 6.

The design may be further elaborated by replacing the cam 31 with a cam 44 as shown in Fig. 7 in which case the undulations will not only be sinuous but will have a superimposed wave such as shown in Fig. 8. If a zig-zag wave is desired, a cam 45 such as shown in Fig. 9 may be employed and a wave as indicated in Fig. 10 will be formed. This form of wave may have an additional wave, as indicated in Fig. 12, by employing a cam 46 as shown in Fig. 11.

From the several examples given, it will be evident that a great variety of combinations and distinctive designs may be readily produced by a simple adjustment of the machine since both the depth and contour of the troughs may be changed at will. The variation in depth may be attained by providing the plate 25′ which supports the guard 25, with an arcuate extension 47 as shown in Fig. 4. This extension may have a slot 48 to receive a bolt fastened in the side of the housing 17 so that the guard may be secured in any desired inclined position.

From the foregoing, it will be evident that a simple and effective machine is provided for ornamenting fur surfaces and although a preferred embodiment of the invention is shown and described herein, it is obvious that many modifications may be made therein without departing from the spirit and scope of the invention as defined by the appended claims.

What is claimed is:

1. A machine for producing ornamental effects in the fur surface of pelts which comprises shearing mechanism, means disposed adjacent said shearing mechanism and about which a fur may be moved past said mechanism, and a guard plate interposed between said shearing mechanism and said means, said guard plate having at least one opening of triangular configuration, the apex of the triangular opening being rounded and pointing in the direction of motion of the fur being acted upon.

2. A machine for producing ornamental effects in the fur surface of pelts which comprises shearing mechanism, means disposed adjacent said shearing mechanism and about which a fur may be moved past said mechanism, a guard plate interposed between said shearing mechanism and said means, said guard plate having at least one opening of triangular configuration, the apex of the triangular opening being rounded and pointing in the direction of motion of the fur being acted upon.

3. A machine for producing ornamental effects in the fur surface of pelts which comprises shearing mechanism, means disposed adjacent said shearing mechanism, and about which a fur may be moved past said mechanism, a guard plate interposed between said shearing mechanism and said means, said guard plate having at least one opening of triangular configuration, the apex of the triangular opening being rounded and pointing in the direction of motion of the fur being acted upon and means for moving said plate transversely to the direction of movement of a fur past said shearing mechanism.

4. A machine for producing ornamental effects in the fur surface of pelts which comprises shearing mechanism, means for conveying a fur past said mechanism, a guard plate disposed between said shearing mechanism and said conveying means, said guard plate having a plurality of openings of triangular configuration, the apex of each triangular opening being rounded and pointing in the direction of motion of the fur being acted upon.

5. A machine for producing ornamental effects in the fur surface of pelts which comprises shearing mechanism, means for conveying a fur past said mechanism, a guard plate disposed between said shearing mechanism and said conveying means, said guard plate having at least one opening therein having outwardly diverging sides, said opening being so formed as to permit the fur to be presented therethrough so that the ends of the fur projecting through said opening define a predetermined contour as presented to the shearing mechanism.

In testimony whereof I affix my signature.

FREDERICK W. HORSTMANN.

CERTIFICATE OF CORRECTION.

Patent No. 1,765,375. Granted June 24, 1930, to

FREDERICK W. HORSTMANN.

It is hereby certified that error appears in the printed specification of the above numbered patent requiring correction as follows: Page 3, line 28, claim 2, after the word "upon" and before the period insert the words "and means for moving said plate"; same page, line 63, claim 5, beginning with the word "therein" strike out all to and including the word "mechanism" in line 68, and insert instead "of triangular configuration, the apex of the triangular opening being rounded and pointed in the direction of motion of the fur being acted upon, and means for reciprocating said plate transversely to the direction of movement of said conveyor and for additionally reciprocating the conveyor during the first reciprocating movement.; and that the said Letters Patent should be read with these corrections therein that the same may conform to the record of the case in the Patent Office.

Signed and sealed this 19th day of August, A. D. 1930.

(Seal)

M. J. Moore,
Acting Commissioner of Patents.